(12) United States Patent
Schmid et al.

(10) Patent No.: US 7,210,190 B2
(45) Date of Patent: May 1, 2007

(54) WIPING DEVICE

(75) Inventors: Eckhardt Schmid, Brackenheim (DE);
Oliver Lenzen, Sachsenheim (DE);
Wolfgang Scholl, Gemmrigheim (DE);
Heiko Ernstmeier,
Bietigheim-Bissingen (DE)

(73) Assignee: Valeo Wischersysteme GmbH (DE)

( * ) Notice: Subject to any disclaimer, the term of this patent is extended or adjusted under 35 U.S.C. 154(b) by 0 days.

(21) Appl. No.: 10/332,662

(22) PCT Filed: Jul. 9, 2001

(86) PCT No.: PCT/EP01/07857

§ 371 (c)(1),
(2), (4) Date: Sep. 5, 2003

(87) PCT Pub. No.: WO02/04265

PCT Pub. Date: Jan. 17, 2002

(65) Prior Publication Data

US 2004/0031122 A1      Feb. 19, 2004

(30) Foreign Application Priority Data

Jul. 12, 2000   (DE) ................................ 100 33 778

(51) Int. Cl.
*B60S 1/38*   (2006.01)
(52) U.S. Cl. .............................. 15/250.43; 15/250.451; 15/250.452; 29/896.91; 29/896.9; 29/417; 29/897.2
(58) Field of Classification Search ........... 15/250.451, 15/250.43, 250.44, 250.454, 250.453, 250.452, 15/250.361; 29/896.91, 896.9, 417, 418, 29/897.2
See application file for complete search history.

(56) References Cited

U.S. PATENT DOCUMENTS

| | | | | |
|---|---|---|---|---|
| 3,018,501 A | * | 1/1962 | Oishei | 15/250.452 |
| 3,083,394 A | * | 4/1963 | Scinta | 15/250.14 |
| 3,114,926 A | * | 12/1963 | Deibel | 15/250.451 |
| 3,132,368 A | * | 5/1964 | Reese | 15/250.451 |
| 3,696,497 A | | 10/1972 | Quinlan et al. | |
| 5,970,569 A | * | 10/1999 | Merkel et al. | 15/250.43 |
| 6,279,191 B1 | * | 8/2001 | Kotlarski et al. | 15/250.201 |
| 6,651,339 B2 | * | 11/2003 | Mazurkiewicz et al. | 29/896.91 |

FOREIGN PATENT DOCUMENTS

| | | | |
|---|---|---|---|
| DE | 198 56 300 | | 6/2000 |
| DE | 100 25 710 | | 8/2001 |
| EP | 0908362 | * | 4/1999 |
| FR | 2283030 | * | 3/1976 |
| WO | WO 99/07586 A1 | | 2/1999 |
| WO | WO 01/62559 A2 | | 8/2001 |
| WO | WO 01/89890 A1 | | 11/2001 |
| WO | WO 01/89891 A1 | | 11/2001 |

* cited by examiner

*Primary Examiner*—Gary K. Graham
(74) *Attorney, Agent, or Firm*—Young Basile (57) ABSTRACT

A wiping device particularly for motor vehicles includes a wiper blade formed of a wiper rubber with two longitudinal grooves arranged opposite each other and a supporting element in the form of two elongated elastic rails arranged in the longitudinal grooves. An adapter element is provided on the supporting element to connect the wiper blades to a driveable wiper arm. A connecting element extending in a cross direction is used to connect the opposite-lying elastic rails and is arranged on at least one of the free ends of the wiper blade. The connecting element is welded to both of the front sides of the extremities of the elastic rails which are situated opposite each other.

14 Claims, 5 Drawing Sheets

WIPING DEVICE

BACKGROUND

The invention relates to a wiping device, specifically for motor vehicles, having a wiper blade which has a wiper rubber with two longitudinal grooves arranged opposite each other and a support element in the form of two ribbon-like, elongated flexible splines positioned in the longitudinal grooves, where an adapter element is provided on the support element to connect the wiper blade to a driveable wiper arm, and where a connecting element extending in the transverse direction is provided on at least one of the open ends of the wiper blade to join the ends of the flexible splines arranged opposite each other. The invention also relates to a wiper blade and a method of producing a wiping device and a wiper blade.

In the case of a known wiping device, the support element in the form of two ribbon-like, elongated flexible splines ensures an optimal distribution of the wiper-blade contact pressure emanating from the wiper arm against the glass. To achieve this, the support element is pre-bent accordingly in its unloaded state, when the wiper blade is not lying against the glass, and has a curvature which depends, among other factors, on the curvature of the glass to be wiped. The support element of a wiping device of this kind replaces the complex and expensive yoke design with two flexible splines located in the wiper body, as they have become known, for example, from DE-15 05 357.

Connecting elements are known from DE 197 29 864 A1, which extend in the transverse direction at the open ends of the wiper blade and which join the flexible splines arranged opposite each other. Such connecting elements, described as retainers in the cited document, consist of several retainer parts connected together which are pushed over the ends of the flexible splines. The disadvantage of this prior art is that the retainers are expensive to assemble since they consist of several individual parts. There is also no assurance that the retainers will not be dislodged under increased loads, for example, when the vehicle drives through a car wash, due to the effects of the brushes and cloth scrubber cleaning systems on the wiping device, which affects the ability of the wiping device to operate. A further disadvantage of a wiping device in accordance with the prior art is that pushing the retainer over the ends of the flexible splines requires the length of the flexible splines to be longer by the space needed for retainer installation than the wiper rubber positioned between the flexible splines.

The object of the present invention is therefore to remedy the disadvantages of the prior art just described.

SUMMARY

This object is achieved with a wiping device by welding the connecting element at the two end faces of the flexible splines arranged opposite each other. What this advantageously achieves is that the connecting element cannot be dislodged, for example, in a car wash. In addition, the connecting element can be advantageously designed as one piece, thereby dispensing with pre-assembly of the connecting element, which results in enormous cost savings, particularly in volume production.

A further advantage of the invention is that the full length of the flexible splines can be used to position the wiper rubber located between the flexible splines, because the connecting element is welded to the end faces of the spring strips arranged opposite each other. The result is a savings in flexible spline material, which once again brings a cost saving in volume production. The wiping device under the invention has the further advantage that increased torsional strength as well as flexural strength perpendicular to the wiping axis is achieved as a result of the welded connection. This reduces any tendency of the wiping device to chatter and oscillate, because of its increased overall strength. This can also be seen in improved high-speed characteristics for the wiping device.

In a particularly advantageous embodiment of the device, welding is performed perpendicular to the end faces of the flexible splines arranged opposite each other, where the end faces of the flexible splines are joined at their contact points with the connecting element. This has the advantage that no weld seams which could present a risk of injury are created on the surface of the wiping device. Any post-treatment of the weld locations, for example, to protect them against corrosion, is also unnecessary.

Advantageously the weld is a laser weld. Extremely precise welds can be made efficiently by means of laser welding, even of small components.

In another embodiment of the invention, an end cap is provided to cover the connecting element. An end cap has the advantage that injuries from the protruding connecting element can be prevented. In addition, when the wiper arms on a vehicle are pivoted back, damage to the vehicle or to the glass because of the protruding connecting element can be prevented. The invention has the advantage that even if the end cap is lost, the operating ability of the wiping device is not harmed.

Under the invention, the end cap can snap over the connecting element from the back, thereby enabling safe and simple installation of the end cap to the wiper blade.

In another embodiment of the invention, the connecting element is a flat element which is as positioned against the end faces of the two flexible splines like a T-joint. This has the advantage that the connecting element can be manufactured from a ribbon-like flat element, which is particularly advantageous in mass production. As a result of the arrangement as a T-joint, the edges of the end faces are completely covered, so that there is no risk of injury from these edges.

When an end cap is used, the cap under the invention can snap over the T-joint, so that the cap can be securely installed on the wiper blade.

In a further development of the invention, the connecting element has a recess on the side facing the spring strips in the area between the flexible splines. When an end cap is used, this recess can be particularly suitable for receiving a snap tab on the end cap. On the other hand, the recess can be shaped in such a way that it acts as an extension of the space between the two flexible splines for receiving the wiper blade, whereby the length of the entire wiper blade in the lengthwise direction can be reduced.

Conversely, it can be arranged for the connecting element to have a projection on the side facing the flexible splines in the area between the flexible splines. This projection can be shaped such that the two facing sides of the flexible splines lie against this projection, one on each side, thereby further increasing the torsional and flexural strength of the wiper blade. On the other hand, a projection of this kind can act as an assembly aid; by placing the two flexible splines against the projection, a specified position of the flexible splines, or of the connecting element, is ensured for welding.

A further, particularly advantageous embodiment of the invention provides for coating the flexible splines, except for the end faces, with an overlay, specifically a corrosion inhibitor, where the connecting element is of a non-corroding material, for example, stainless steel. Since the flexible splines are cut to length during manufacture from a continuous spring-steel strip having this overlay, the end faces of the flexible splines have no corresponding overlay. If, as proposed under the invention, these end faces are welded to a non-rusting connecting element in such a way that the weld is made perpendicular to the end faces of the flexible splines arranged opposite each other, and the end faces of the flexible splines are connected at the contact points with the join through the weld, no corrosion, at least no visible corrosion, occurs on the wiper blade.

In another embodiment of the invention, the side of the wiper rubber facing away from the glass has a spoiler-like shape. In addition, the side of the end cap facing away from the glass has a matching spoiler-like shape, whereby, particularly at higher vehicle speeds, the contact pressure of the wiper blade against the glass is also advantageously increased at the wiper blade ends.

To achieve the object stated above, specifically of efficient manufacture and production of a wiping device under the invention, a method is also proposed characterized in that a ribbon-like connecting material is brought up to the end faces of the flexible splines, that the strip-like connecting material is laser welded to the end faces of the flexible splines, and that, in a following step, the ribbon-like connecting material is laser cut to the dimensions of the connecting element. The connecting material can, for example, be taken from rolls as continuous material and fed directly to the flexible splines by means of suitable equipment. Since the cutting to length of the connecting material to the dimensions of the connecting element takes place after the welding procedure, all the pre-handling or pre-assembly of the connecting element is eliminated. Enormous cost savings can be realized as a result, particularly in mass production.

BRIEF DESCRIPTION OF THE DRAWING

Additional advantageous embodiments and details of the invention can be found in the claims and the description to follow, in which the invention is described and explained in greater detail using the embodiments shown in the drawing.

DETAILED DESCRIPTION

Figure 1:
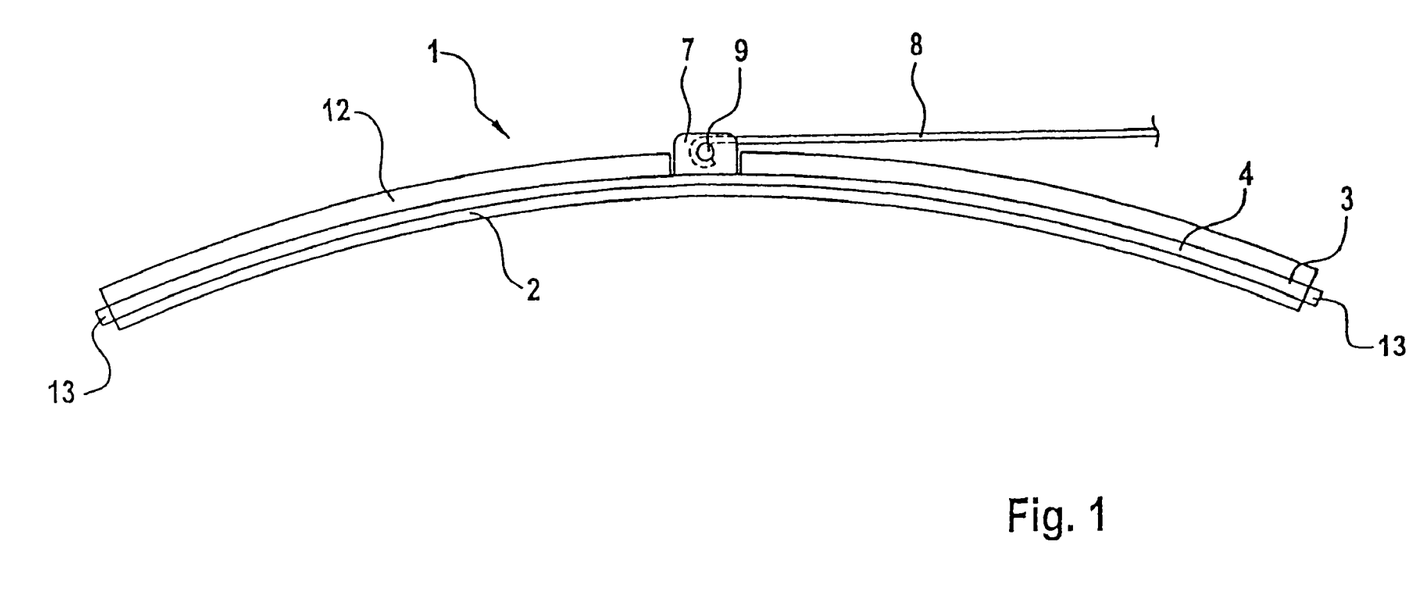
FIG. 1 shows a wiping device under the invention in a side view.
Figure 2:
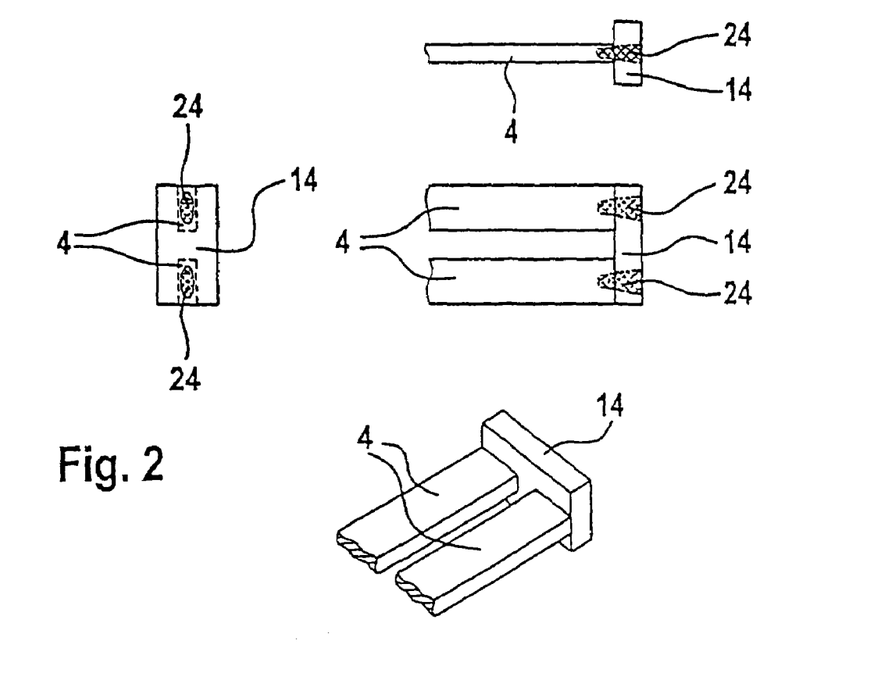
FIGS. 2A–2D, 3A–3D, 4A–4D 5A–5D and 6A–6D show views of differently shaped connecting elements.
Figure 3:
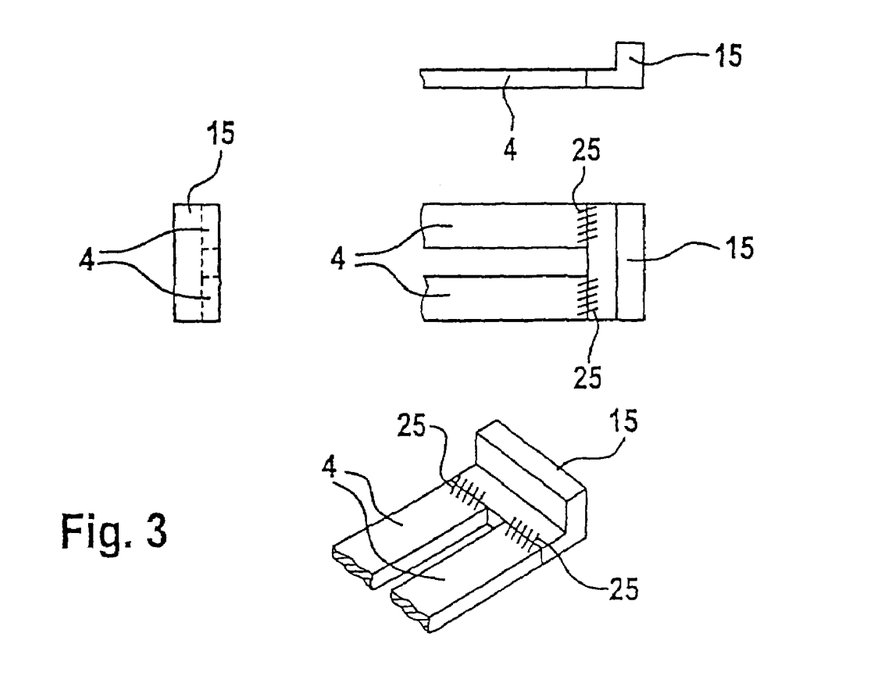
Figure 4:
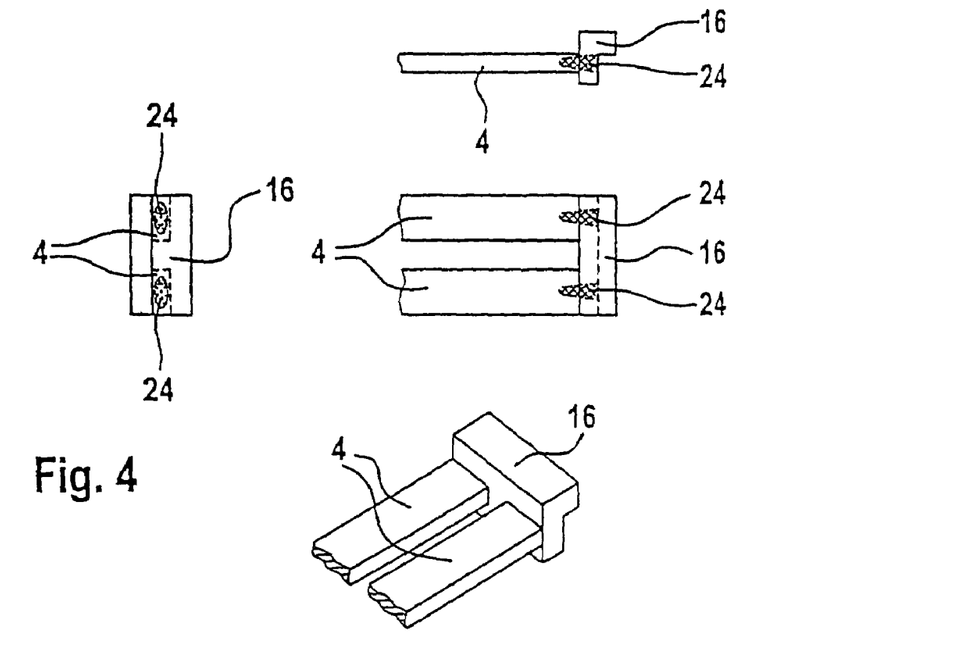
Figure 5:
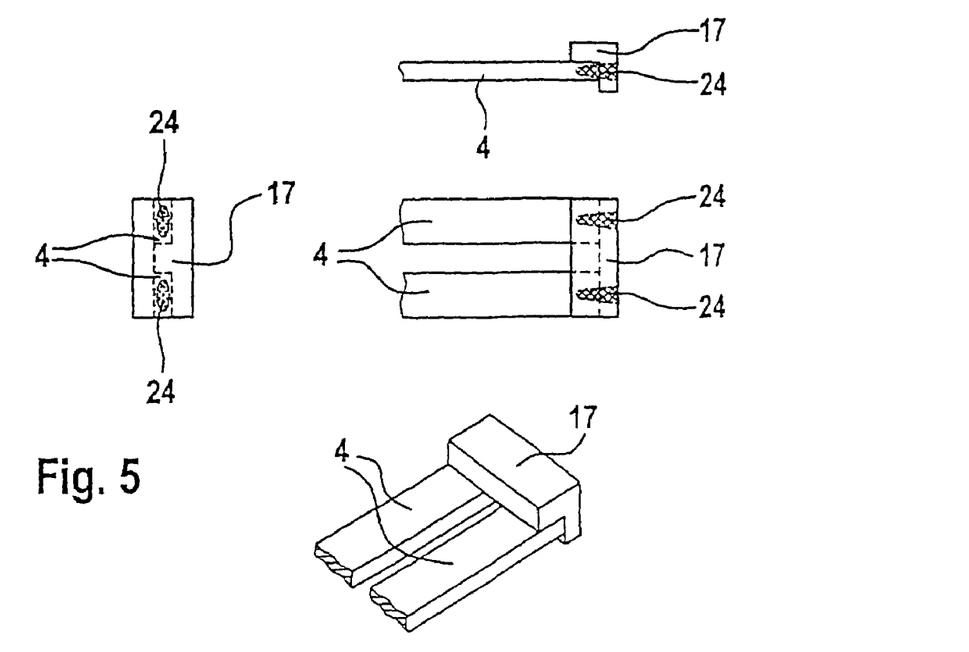
Figure 6:
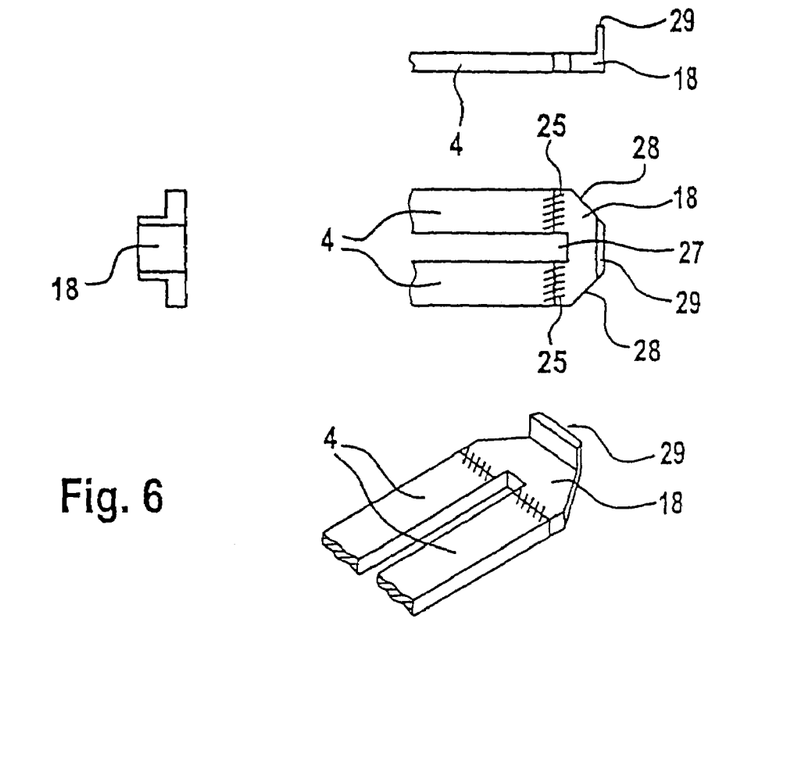

The wiping device 1 for vehicles shown in FIG. 1 has a wiper blade with a wiper rubber with two longitudinal grooves 3 opposite each other—where only one longitudinal groove 3 can be seen in the view from FIG. 1—in which a supporting element is located in the form of two ribbon-like, elongated flexible splines 4. An adapter element 7 is furnished on the two flexible splines 4 to connect the wiper blade with a driveable wiper arm 8. The end of the wiper arm 8 facing the wiper blade is hook-shaped and engages a pivot pin 9. In order to achieve increased contact pressure of the wiping device 1, particularly at elevated vehicle speeds, against the glass to be wiped, which is not shown, the side of the wiper rubber 2 facing away from the glass has a spoiler-like rise 12. A connecting element 13 is welded to the open ends of the wiper blade on the end faces of the ends of the flexible splines 4 arranged opposite each other.

As can be seen from FIGS. 2A–7D, various types of connecting element 13 are conceivable, which are welded in different ways to the end faces of the flexible splines 4.

For example, FIGS. 2A–2D show a flat-shaped connecting element 14, which is welded in the manner of a T-joint to the two end faces of the flexible splines 4 arranged opposite each other. The weld locations 24 show a weld made perpendicular to the end faces of the flexible splines 4 arranged opposite each other, where the end faces of the flexible splines 4 are joined to the connecting element 14 at the contact points. A weld of this kind can be implemented specifically using laser welding technology. A particular advantage of this type of weld is that no weld seams visible from the outside result. A weld of this type also has the advantage that any potential corrosion on the end faces of the flexible splines 4 is not visible, or is not visible from the outside.

FIGS. 3A–3D show another inventive embodiment in which a connecting element 15 with an L-profile is welded to the end faces of the two flexible splines 4. Two weld seams 25 on the surface of the flexible splines 4 and of the connecting element 15 are shown. Weld seams of this type 25, however, have the disadvantage that they are exposed to the weather and are prone to corrosion. The connecting element 15 has the advantage that it terminates flush with the upper and lower sides of the two flexible splines 4, so that a wiper blade can lie on the connecting element 15 and be supported.

Two different embodiments are shown in FIGS. 4A–4D and FIGS. 5A–5D, in which two connecting elements 16 and 17 each has an L-shaped cross section. The connecting elements 16 and 17 are laser-welded preferably to the end faces of the flexible splines 4, in the same manner as the connecting element 14 from FIGS. 2A–2D.

The connecting elements 14, 15, 16, 17 in accordance with the embodiments from FIGS. 2A–5D have the particular advantage that they can be produced in a simple fashion by cutting to length a continuous ribbon which has the desired profile. It is conceivable to bring the ribbon-like continuous profile up to the end faces of the flexible splines 4, to weld it to the splines 4 first, and then cut the connecting elements 14–17 to length to the specified dimensions. The use of a laser welder is advantageous, first to produce the laser weld and then to cut the connecting element to the desired length.

Figure 7:
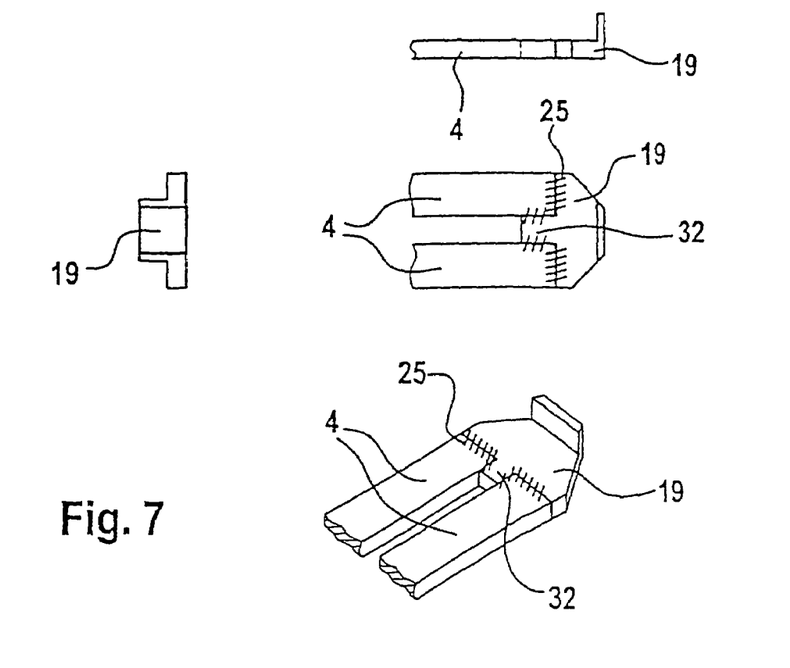
FIGS. 7A–7D are views showing how the connecting elements are attached to the end faces of the flexible splines, each time in different views.
Figure 8:
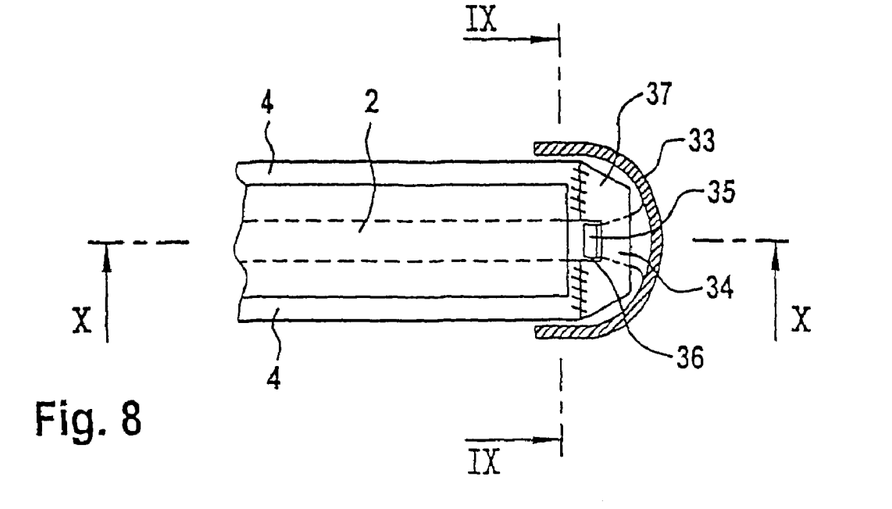
FIGS. 8–10 show different cross-sectional views of a further inventive aspect with an end cap.

The connecting elements 18 and 19 shown in FIGS. 6A–7D are shaped in such a way that they are particularly suited for an end cap to engage them from behind, as shown in FIG. 8. The connecting element 18 provides a recess 27 on the side facing the flexible splines 4 in the area between the flexible splines 4. On the side facing away from the flexible splines 4, the connecting element additionally has two chamfers 28, which firstly brings about a weight reduction and secondly makes the connecting element 18 smaller. On the long side of the connecting element 18 there is a lip 29 between the two chamfers 28 which can be furnished as a stop or as a receiving element for an end cap, not shown in FIGS. 6A–6D.

The connecting element 19 shown in FIG. 7 differs from the connecting element 18 from FIGS. 6A–6D in that it does not provide a recess 27 but instead a projection 32 on the side facing the flexible splines 4 in the area between the flexible splines 4. The projection can be used firstly as a contact surface for the wiper rubber, secondly as a spacer between the two flexible splines 4.

The connecting elements 18 and 19 from FIGS. 6A–7D are welded to the specific flexible splines 4 by means of the weld seams 25. It is conceivable that in place of weld seams 25, a weld in accordance with FIG. 1 is provided, in which the end faces of the flexible splines 4 are joined to the connecting element 18 or 19 at the contact points.

Figure 9:
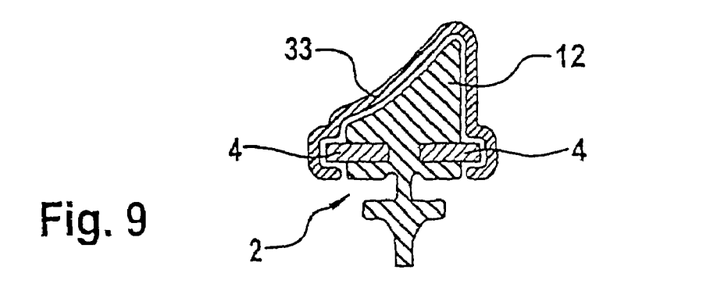
Figure 10:
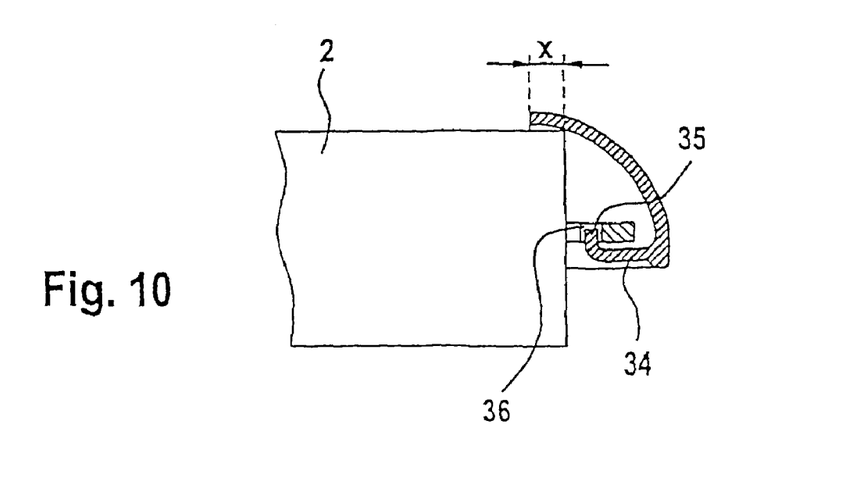

An embodiment with an end cap 33 is shown in FIGS. 8–10. As can be seen clearly from FIG. 8, the end cap has a tongue 34 with a snap tab 35 which makes a snap-fit engagement in a recess 36 on the connecting element 37.

As is shown in the section shown in FIG. 9, the end cap has a spoiler-like shape, so that it encloses the spoiler 12 of the wiper rubber 2.

The tongue 34 with the snap tab 35 which engages the recess 36 is clearly recognizable in the section from FIG. 10. It can also be seen from FIGS. 8 and 10 that the end cap 33 covers the wiper rubber 2 in the area identified by "x". This cap cover area x is designed in such a way that the changes in length of the wiper rubber 2 caused by natural shrinkage of the wiper rubber 2 and the changes in temperature to which the wiper rubber 2 is exposed are taken into consideration.

The end cap shown in FIGS. 8–10 can be shaped in such a way that it fits closely over the areas of the flexible splines 4 protruding from the wiper rubber 2, so that together with this match fit, the end cap 33 is joined to the wiper blade so that it cannot be detached, or only with difficulty, and is still simple to install.

All the features presented in the description, the claims to follow and the drawing can be essential to the invention both individually as well as in any combination.

The invention claimed is:

1. A wiping device having a wiper blade including a wiper rubber with two longitudinal grooves opposite each other and a support element in the form of two stripe-like, elongated flexible splines positioned in the longitudinal grooves, where an adapter element is provided on the support element to connect the wiper blade to a driveable wiper arm and where at least a connecting element extending in the transverse direction is provided on at least one open end of the wiper blade to connect an end of each of the flexible splines arranged opposite each other, characterized in that the connecting element is welded to an end face of each of the flexible splines arranged opposite each other, wherein the connecting element is a flat element which is connected as a T-joint to the end faces of the two flexible splines.

2. The wiping device from claim 1, wherein the weld is made perpendicular to the end faces of the flexible splines arranged opposite each other.

3. The wiping device from claim 1, wherein the weld is a laser weld.

4. The wiping device from claim 1, wherein an end cap is furnished to cover the connecting element.

5. The wiping device from claim 4, wherein the end cap snaps on behind the connecting element.

6. The wiping device from claim 1, wherein an end cap snaps on behind the T-joint.

7. The wiping device from claim 1, wherein the end face is a non-coated end face.

8. A wiping device having a wiper blade including a wiper rubber with two longitudinal grooves opposite each other and a support element in the form of two stripe-like, elongated flexible splines positioned in the longitudinal grooves, where an adapter element is provided on the support element to connect the wiper blade to a driveable wiper arm and where at least a connecting element ending in the transverse direction is provided on at least one open end of the wiper blade to connect an end of each of the flexible splines arranged opposite each other, characterized in that the connecting element is welded to an end face of each of the flexible splines arranged opposite each other, wherein the connecting element has a recess on the side facing the flexible splines in the area between the flexible splines, wherein an end cap snaps into the recess from behind.

9. A wiping device having a wiper blade including a wiper rubber with two longitudinal grooves opposite each other and a support element in the form of two strip-like, elongated flexible splines positioned in the longitudinal grooves, where an adapter element is provided on the support element to connect the wiper blade to a driveable wiper arm and where at least a connecting element extending in the transverse direction is provided on at least one open end of the wiper blade to connect an end of each of the flexible splines arranged opposite each other, characterized in that the connecting element is welded to an end face of each of the flexible splines arranged opposite each other, wherein the flexible splines are coated with a corrosion inhibitor overlay, except for the end faces, and wherein the connecting element is formed of a non-corroding material.

10. The wiping device from claim 9, wherein the connecting element has a recess on the side facing the flexible splines in the area between the flexible splines.

11. The wiping device from claim 9, wherein the connecting element has a projection on the side facing the flexible splines in the area between the flexible splines.

12. The wiping device from claim 9, wherein the side of the wiper rubber facing away from the glass has a spoiler-like shape, and the side of the end cap facing away from the glass has a corresponding spoiler-like shape.

13. A method for manufacturing a wiping device having a wiper blade including a wiper rubber with two longitudinal grooves opposite each other and a support element in the form of two strip-like, elongated flexible splines positioned in the longitudinal grooves, where an adapter element is provided on the support element to connect the wiper blade to a driveable wiper arm and where at least a connecting element extending in the transverse direction is provided on at least one open end of the wiper blade to connect an end of each of the flexible splines arranged opposite each other, characterized in that the connecting element is welded to an end face of each of the flexible splines arranged opposite each other, wherein the connecting element is a flat element which is connected as a T-joint to the end faces of the two flexible splines characterized by the steps of:
 bring a ribbon-like connecting material to the end faces of the flexible splines;
 laser-welding the ribbon-like material to the end faces of the flexible splines; and
 laser cutting the ribbon-like connecting material to the dimensions of the connecting element.

14. A method for manufacturing a wiping device having a wiper blade including a wiper rubber with two longitudinal grooves opposite each other and a support element in the form of two strip-like, elongated flexible splines positioned in the longitudinal grooves, where an adapter element is provided on the support element to connect the wiper blade to a driveable wiper arm and where at least a connecting element extending in the transverse direction is provided on at least one open end of the wiper blade to connect an end of each of the flexible splines arranged opposite each other, characterized in that the connecting element is welded to an end face of each of the flexible splines arranged opposite each other, wherein the connecting element is a flat element which is connected as a T-joint to the end faces of the two flexible splines characterized by the steps of:

bringing a ribbon-like connecting material to the end faces of the flexible splines;

laser-welding the ribbon-like material to the end faces of the flexible splines using laser welding equipment; and laser cutting the ribbon-like connecting material to the dimensions of the connecting element using laser cutting equipment.

* * * * *

UNITED STATES PATENT AND TRADEMARK OFFICE
CERTIFICATE OF CORRECTION

PATENT NO. : 7,210,190 B2 Page 1 of 1
APPLICATION NO. : 10/332662
DATED : May 1, 2007
INVENTOR(S) : Eckhardt Schmid et al.

It is certified that error appears in the above-identified patent and that said Letters Patent is hereby corrected as shown below:

Column 5, Line 41; In Claim 1, delete "stripe-like" and insert --strip-like--, therefor.
Column 6, Line 3; In Claim 8, delete "stripe-like" and insert --strip-like--, therefor.
Column 6, Line 7; In Claim 8, delete "ending" and insert --extending--, therefor.
Column 6, Line 56; In Claim 13, delete "bring" and insert --bringing--, therefor.

Signed and Sealed this

Sixth Day of November, 2007

JON W. DUDAS
*Director of the United States Patent and Trademark Office*